United States Patent
Mendelson et al.

(10) Patent No.: US 7,558,946 B2
(45) Date of Patent: Jul. 7, 2009

(54) BREAKING A LOCK SITUATION IN A PROCESSOR WITHOUT DETECTION OF THE LOCK SITUATION USING A MULTI-LEVEL APPROACH

(75) Inventors: Avi Mendelson, Haifa (IL); Michael Mishaeli, Zichron Yakov (IL); Julius Mandelblat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 11/301,058

(22) Filed: Dec. 12, 2005

(65) Prior Publication Data
US 2007/0150703 A1 Jun. 28, 2007

(51) Int. Cl.
G06F 9/00 (2006.01)
G06F 11/00 (2006.01)
(52) U.S. Cl. .............................. 712/220; 714/2; 714/23
(58) Field of Classification Search ................. 712/219, 712/220, 245; 714/2, 10, 23
See application file for complete search history.

(56) References Cited

U.S. PATENT DOCUMENTS

| | | | | |
|---|---|---|---|---|
| 4,979,105 A * | 12/1990 | Daly et al. | ..................... | 714/10 |
| 6,247,121 B1 | 6/2001 | Akkary et al. | .............. | 712/239 |
| 6,542,921 B1 * | 4/2003 | Sager | .......................... | 718/108 |
| 2002/0004915 A1 * | 1/2002 | Fung | ........................... | 713/320 |
| 2002/0116600 A1 * | 8/2002 | Smith et al. | .................. | 712/218 |
| 2003/0093657 A1 * | 5/2003 | Mayfield | ..................... | 712/245 |
| 2004/0215933 A1 * | 10/2004 | Nguyen et al. | .............. | 712/200 |
| 2004/0215988 A1 * | 10/2004 | Clabes et al. | ................ | 713/300 |
| 2006/0064695 A1 | 3/2006 | Burns et al. | ................. | 718/100 |
| 2006/0161738 A1 | 7/2006 | Saha et al. | ................... | 711/150 |
| 2006/0179289 A1 * | 8/2006 | Floyd et al. | .................. | 712/227 |
| 2007/0245350 A1 * | 10/2007 | Abernathy et al. | ........... | 718/102 |

OTHER PUBLICATIONS

"Chip Multithreading: Opportunities and Challenges" High-Performance Computer Architecture, 2005. HPCA-11. 11th International Symposium on; Publication Date: Feb. 12-16, 2005; On pp. 248-252.*

"Resource preemption"—Everything2—http://www.everything2.com/index.pl?node_id=1168982&displaytype=printable—Sep. 30, 2001.*

U.S. Appl. No. 11/513,636, filed Aug. 31, 2006, entitled "Detecting And Resolving Locks In A Memory Unit," by Prakash Math, Matthew Merten, Sebastien Hily, Beeman Strong, Morris Marden and David Burns.

* cited by examiner

*Primary Examiner*—Eddie P Chan
*Assistant Examiner*—Keith Vicary
(74) *Attorney, Agent, or Firm*—Trop, Pruner & Hu, P.C.

(57) ABSTRACT

In one embodiment, the present invention includes a method including initiating a cleaning operation to clear a first processor core of a system of pending operations, and preventing injection of new events into a second processor core if the cleaning operation is not serviced in the first processor core. In this way, lock situations may be broken without their detection. Other embodiments are described and claimed.

28 Claims, 4 Drawing Sheets

BREAKING A LOCK SITUATION IN A PROCESSOR WITHOUT DETECTION OF THE LOCK SITUATION USING A MULTI-LEVEL APPROACH

BACKGROUND

Embodiments of the present invention relate to data processing in a computer system, and more particularly to resolving a lock situation in a system.

Typical systems designed today are complex systems that include multiple processing engines, such as multiprocessor systems, multicore processors, and the like. Furthermore, multiple threads or blocks can be processed simultaneously in one or more processors of the system. Accordingly, the operation and synchronization of different portions of a system are becoming more involved.

One problem that arises as a result of the increased complexity of computing systems is a lock situation. Such a situation occurs when multiple blocks desire to use the same resource. Such blocks may be different software threads, different system components or the like, and similarly, the resources competed for may be hardware resources of a processor or other system components, or data owned by a system agent.

When multiple blocks of a system compete for ownership of a resource, performance can be negatively affected. In one scenario, at least one block cannot make forward progress until it is able to obtain ownership of the resource. In an even more serious scenario, neither of an owning system block and a requesting system block can make forward progress as the requesting block consumes the owning block with requests for ownership or similar requests. Other examples of a lock situation are when two blocks wait for each other to release an occupied resource.

A mutual lock situation may be of different types, including a so-called "live" lock situation or a so-called "dead" lock situation. In a live lock situation, one or more blocks is highly active in attempting to gain ownership of the desired resource. In such a situation, the owner block may find it very difficult to make forward progress with its task as repeated requests for ownership are received from the requesting block. In a dead lock situation, one or more blocks may simply be in a wait state, waiting for a desired resource. However, during this wait state, the block does not perform any useful work.

During both design and validation stages, efforts are made to avoid such lock situations. However, in light of the complexity of modern systems, lock situations continue to occur. A typical manner of attempting to resolve a lock situation is for a system to detect the presence of a lock situation and try to break the lock. While often successful, this approach demands prediction of the areas where the lock can happen. Such lock detection or prediction functionality can consume significant hardware and/or processing capabilities. Accordingly, a need exists for an improved manner of resolving lock situations.

DETAILED DESCRIPTION

In various embodiments, methods and apparatus may be implemented to attempt to resolve lock situations without the need for detecting the presence of a lock. In such manner, improved lock breaking may be possible as undetectable lock situations can still be resolved in accordance with an embodiment of the present invention. To effect such lock breaking, one or more benign operations may be implemented within a system. As used herein, the term benign operation means an operation such as a "clearing" event that happens regularly in the system, sometimes even in a redundant manner, and thus does not negatively affect performance of a system. While many different types of benign operations are possible, in certain implementations benign operations may include cleaning operations or stall events which cause system resources, e.g., processors or resources thereof, to be cleared of events at periodic intervals that do not affect system performance. As one example, such benign operations may be performed at a relatively slow rate with respect to machine cycles. For example, such benign operations may be initiated on the order of between approximately 0.1 seconds (s) to approximately 1.0 s, although the scope of the present invention is not so limited.

In this way, the benign operations do not negatively affect system performance. Furthermore, these benign operations may be performed at an interval such that the timing of these operations corresponds to a significant portion of, for example, a time-out timer, which times out operation of a processor when it is in a hung-up state and unable to do any useful work. As an example, many systems include such a time-out timer that causes a time out to occur when the system is locked up, e.g., for approximately 2 s, which in turn leads to a shut down of the system. Thus, a benign interval may correspond to an interval at which the benign operation occurs, which may be less than the length of a time-out timer and greater than a relatively large number of machine cycles. That is, a benign interval may be a significant portion of the length of a time-out timer, for example, at least approximately a quarter of the time-out timer.

In one embodiment, two different benign operations may be executed, with a first benign operation having a less significant system impact to be performed first. A second more significant benign operation may then be performed only if the first benign operation is unsuccessful. In this manner, effects on system performance are further reduced.

In one embodiment, the first event may correspond to a cleaning or clearing operation, referred to herein as a periodic nuke event (PNE). Such an event may be implemented to enable clearing of pending operations from various blocks, e.g., multiple processor cores or the like. The second benign operation may be a stall event, which may be used to prevent injection of new operations into different system blocks, e.g., multiple processor cores, in a sequential manner for a limited period of time.

While different implementations of these events are possible, in one embodiment a PNE may be used to clean a system from pending operations. For example, a PNE may be applied to all processor cores of a system to enable clearing each of the processor cores of its pending operations. In one embodiment, a control signal may cause all processor cores to initiate a PNE simultaneously. Specific manners of handling such a PNE are discussed further below. In one implementation, the control signal to initiate the PNEs may be based on a clock signal that is triggered at a periodic interval, e.g., 0.25 s, although the scope of the present invention is not so limited. In various embodiments, the interval of the PNE timer signal may be controlled based on configuration information, e.g., present in a control register of a processor.

Upon successful completion of the PNE in a processor core, that core may send an acknowledgment signal indicating its successful completion. If all processor cores provide such a signal prior to the time of the next signal that causes initiation of another PNE, no additional (i.e., different) benign operations are needed, and any lock situation that may have been present may thus have been cleared. If however, one or more of the processor cores is unable to complete the PNE before the PNE trigger signal, this may be indicative of a lock situation that the PNE could not break.

In such event, the second benign operation, e.g., a stall event, may be initiated in the processor cores. In one embodiment, the stall event may be initiated in a sequential manner such that only one processor core at a time is stalled for a limited time, which may correspond to a predetermined number of machine cycles. Upon completion of the stall period for a first processor core, a second processor core may be stalled and so forth. In such manner, more stubborn lock situations may be resolved.

Different embodiments may be implemented in different ways. For example, different combinations of software, hardware and firmware may be provided to attempt to break lock situations in accordance with an embodiment of the present invention.

Figure 1:
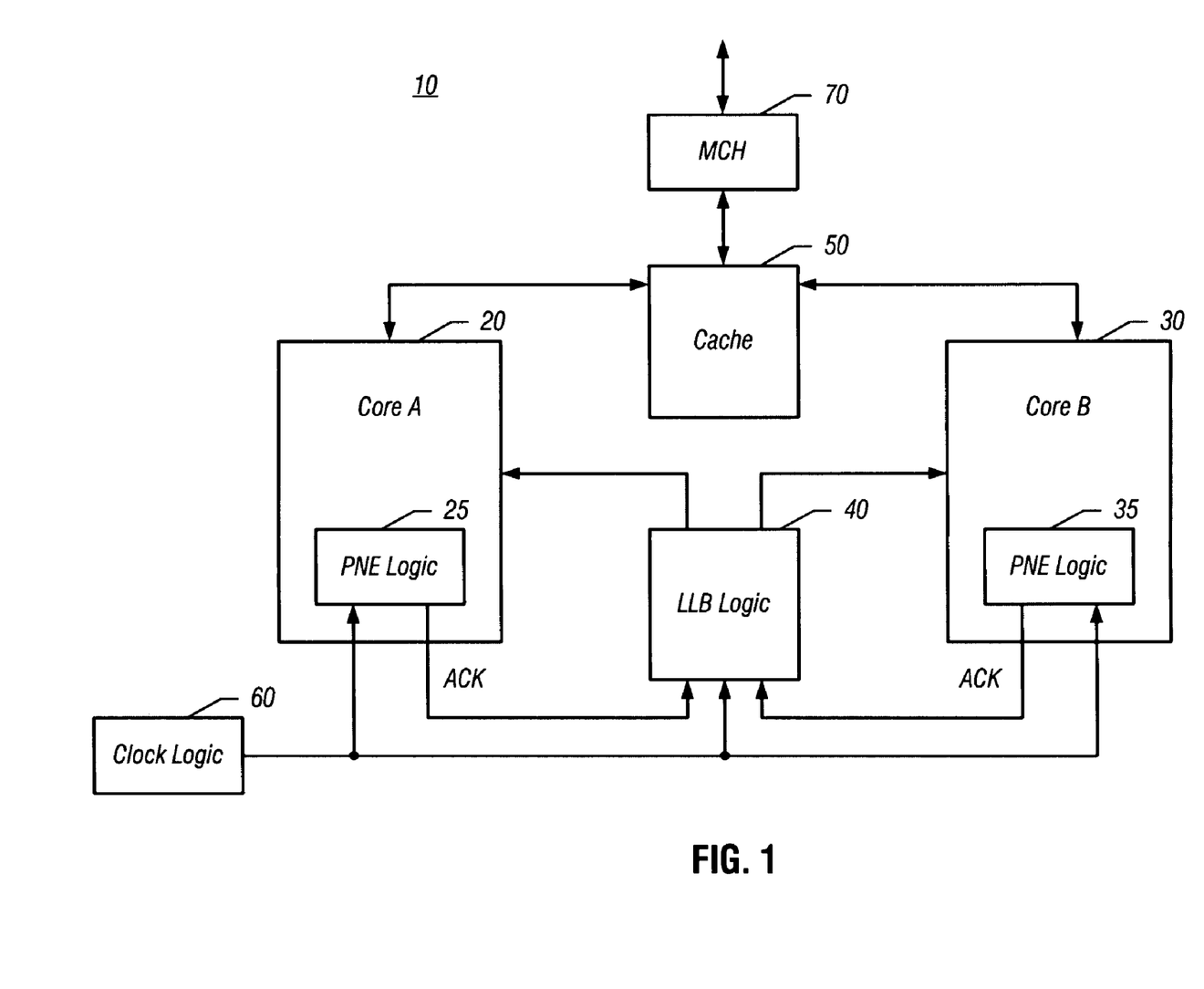
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 may be a multi-core processor. While shown in the embodiment of FIG. 1 as including two cores (i.e., a dual-core processor) it is to be understood that the scope of the present invention is not so limited. Thus in other embodiments more cores, and potentially many more cores may be present. Similarly, in other embodiments a single core processor may be used also.

Still referring to FIG. 1, processor 10 includes a first core (i.e., core A) 20 and a second core (i.e., core B) 30. As shown in FIG. 1, each core further includes a PNE logic 25 and 35, respectively. Each of these PNE logic blocks may be adapted to implement a PNE for its associated core. As shown in FIG. 1, each PNE logic block is coupled to receive a signal from a clock logic 60. In various implementations, clock logic 60 may be an independent internal clock generated in processor 10. Alternately, clock logic 60 may be associated with other system components, such as a real-time clock, a time-out timer, or the like.

As shown in FIG. 1, in addition to first core 20 and second core 30, processor 10 further includes a cache memory 50 and a memory controller hub (MCH) 70, which may include memory controller functionality to enable communication between processor 10 and one or more memories to which it is coupled, e.g., a dynamic random access memory (DRAM) coupled to processor 10, e.g., over a front-side-bus (FSB) (not shown in FIG. 1).

Still referring to FIG. 1, processor 10 further includes a live lock breaker (LLB) logic 40. LLB logic 40 may be a per-processor logic block to perform additional benign operations in an effort to break a lock situation. While shown as being per-processor logic, it is to be understood that the scope of the present invention is not so limited, and in other embodiments this logic may be implemented on a per-core basis. Alternately, such logic may be implemented elsewhere within a system to act globally with respect to multiple processors of a system. As shown in FIG. 1, LLB logic 40, which may be a finite state machine (FSM) in one embodiment, is coupled to first core 20 and second core 30 to enable initiation of certain benign events as will be discussed further below. While shown with these particular components in the embodiment of FIG. 1 for ease of illustration, it is to be understood that different processors may have many different components and other structures not shown in FIG. 1.

In various embodiments, clock logic 60 may be adapted to generate a PNE enable signal at a periodic interval. This signal may thus be coupled from clock logic 60 to PNE logic 25 and 35. In some implementations, PNE logic 25 and 35 each may be implemented as a finite state machine (FSM), although other implementations are possible. Furthermore, while shown as being per-core logic, in other implementations a globally-located logic may be adapted to initiate a PNE across multiple cores.

In one embodiment, a PNE may be initiated by PNE logic 25 and 35 upon receipt of an enable signal from clock logic 60. Upon receipt of this signal, PNE logic 25 and 35 may send a signal to microcode of its associated core (not shown in the embodiment of FIG. 1). This signal may cause the execution of microcode to clear various resources of the associated core from pending operations. Different manners of performing this clearing operation may be effected. For example, a pipeline of the core may be cleared or flushed via the PNE. Depending on whether a lock situation is present (or other system factors), the PNE may or may not be successful. If PNE logic 25 and 35 are able to successfully perform a PNE in its associated core, they will send an acknowledgment signal (ACK) to LLB logic 40. If however one (or both) of PNE logic 25 and 35 is unsuccessful in servicing the PNE request, the acknowledgment signal is not sent from that logic. For example, a core may be in a state such that it is not accepting new events and thus does not service the PNE request. In this instance, the PNE would not be performed and the acknowledgment is accordingly not sent.

LLB logic 40 may be adapted to perform the second benign operation. More specifically, LLB logic 40 may be adapted to initiate stall events across multiple system blocks. For example, with reference still to FIG. 1, LLB logic 40 may initiate stall events in first core 20 and second core 30. These stall events may be initiated if one or both of the cores fail to provide an ACK signal to LLB logic 40 prior to receipt of a next signal from clock logic 60. Accordingly, LLB logic 40 may initiate stall events when one or more of the cores is unsuccessful in performing a PNE. In one implementation, LLB logic 40 may be adapted to initiate sequential stall events, such that only a single core is stalled at any one time. Upon completion of a stall event in first core 20 a stall event may be initiated in second core 30.

While shown in FIG. 1 as being per-processor logic, in other implementations the live lock breaker logic may be implemented on a more global scale, e.g., a per-system basis or instead may be implemented more locally, e.g., on a per-core basis, in other embodiments. Furthermore, in some embodiments a single controller such as a microcontroller may be adapted to perform the multiple benign operations across multiple cores (or even multiple processors). Further, while described herein with respect to a particular out-of-order processor architecture, it is to be understood that the scope of the present invention is not so limited. Other embodiments may be used in connection with an in-order processor or an out-of-order processor of a different architecture. Furthermore, some implementations may be used to provide breaking of lock situations without the need for detection in other system components, such as controllers and other types of processing engines, for example.

Figure 2:
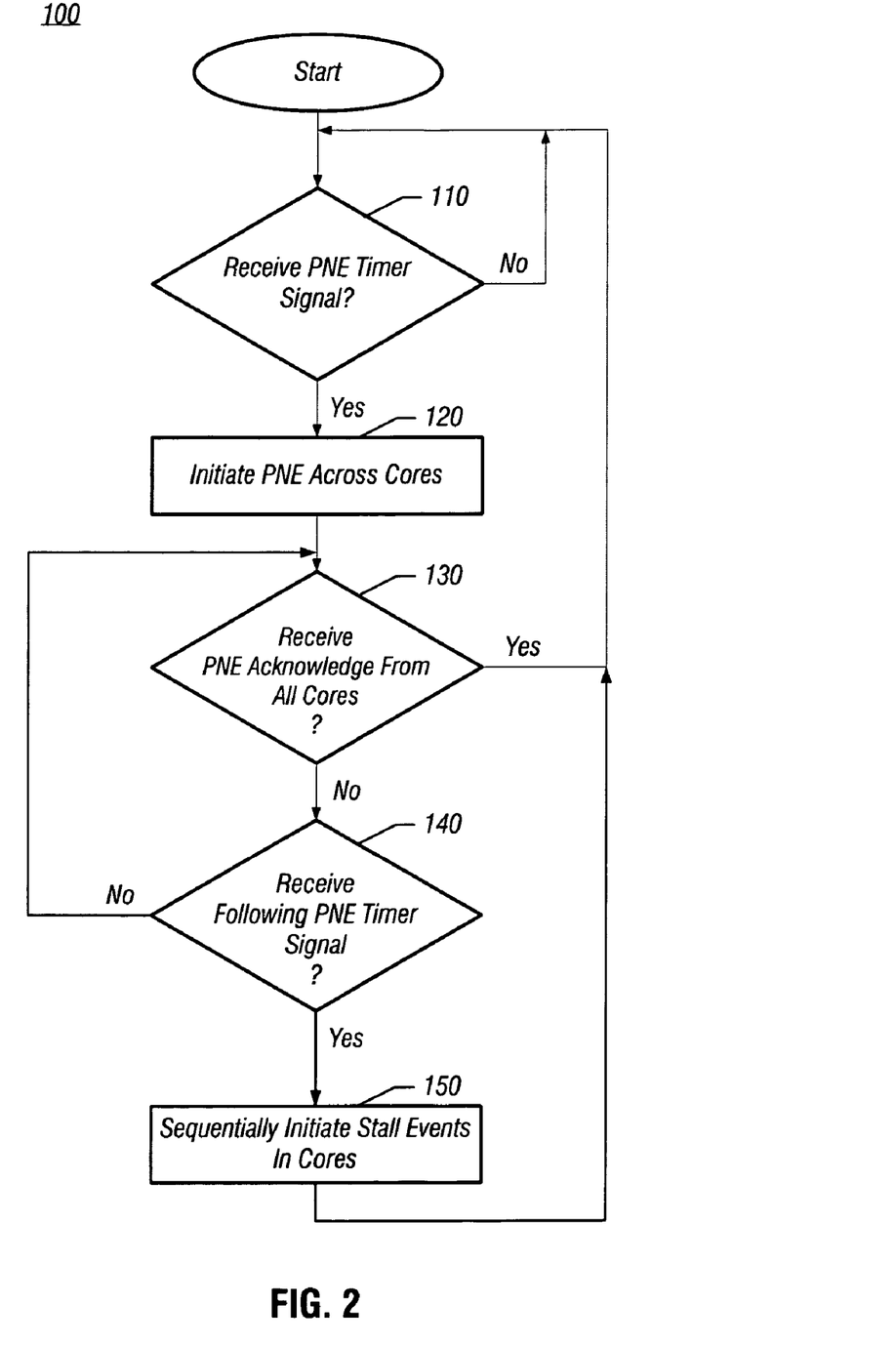
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may be used to attempt to break lock situations in accordance with an embodiment of the present invention. Method 100 may begin by determining whether a PNE timer signal has been received (diamond 110). For example, PNE logic may be adapted to receive an enable signal (e.g., a PNE timer signal) at a periodic frequency so that a PNE may be performed without impacting system performance. As discussed above, such a frequency may vary widely, but in certain embodiments the PNE signal may be received at an interval of between approximately 0.1 s and 1.0 s. In some embodiments, the determination of diamond 110 may be performed by per-core PNE logic, although other implementations are possible. Diamond 110 may loop back on itself until such a PNE timer signal is received.

Upon receipt of this periodic timer signal, a PNE may be initiated across all cores of a system (block 120). The PNE may be performed simultaneously in all cores of a system, for example. Different manners of performing a PNE can be effected in different implementations, based on different system architectures. As one example, a processor architecture including a pipeline having various buffers or queues for storing pending and completed operations and further including microcode may receive an instruction to cause the microcode to initiate clearing of the buffers. For example, in one embodiment a processor architecture may include a memory order buffer (MOB), a reorder buffer (ROB) and the like. In different implementations, microcode executed upon receipt of a PNE enable signal may cause clearing of these different buffers or other pipeline resources.

If a given core successfully executes the PNE, it may send an acknowledgment message, for example, to associated LLB logic. Accordingly, still referring to FIG. 2, next it may be determined whether a PNE acknowledgement was received from all cores (diamond 130). Thus LLB logic, for example, may receive acknowledgment signals from one or more cores of a system and store the signals in a table or other structure. So long as the next PNE timer signal has not been received (as determined next at diamond 140), control loops back to diamond 130 for further determination of whether all cores have provided an acknowledgment signal.

If the prior PNE was successfully completed across all cores, for example, via the LLB logic checking the table to verify that all system cores acknowledged successful completion of the PNE, control passes to diamond 110, discussed above, where a new PNE may be executed across all platform cores upon receipt of the next PNE timer signal.

If instead, not all cores provide an acknowledgment signal before a next PNE timer signal is received at diamond 140, this is an indication that a lock condition may be present that was not broken via the PNEs. As an example, a PNE may be unsuccessful if a given core is stuck in a loop executing one or more microinstructions (μops) associated with a macroinstruction. That is, in some embodiments a PNE may be initiated at a macroinstruction boundary, i.e., after a current macroinstruction ends. If a core is stuck on a macroinstruction, it will not reach the boundary to accept the PNE. Accordingly, if at diamond 140 not all cores provided a PNE acknowledgement prior to the next PNE timer signal, control passes to block 150.

There, stall events may be sequentially initiated in all cores of the system (block 150). For example, LLB logic may send a signal to a first core to initiate a stall event in that core. Upon completion of that stall event, the LLB logic may initiate a stall event in a next core and so forth. In an embodiment for a dual-core processor, the stall event may be initiated in a core opposite the core from which an acknowledgment signal was not received. That is, assume a core A did not send an acknowledgment signal but a core B did. The stall event may first be initiated in core B, as the lack of acknowledgment from core A may indicate that core A is locked up due to an attack from core B. Note that in some embodiments, the stall events may be terminated upon receipt of an acknowledgment of successful completion of the PNE by all cores.

Different manners of initiating stall events may be implemented in different architectures. For example, in one embodiment a stall event may be initiated in a core by preventing insertion of new operations for a predetermined period of time. This period of time may vary in different embodiments, but may correspond approximately to a number of cycles that allows pending core operations to be executed. At the conclusion of the determined number of cycles, the stall event is removed from the first core and the LLB logic may initiate a stall event in a next core and so forth. In some embodiments, a mechanism may be provided to stop stall events if a lock is cleared by a first (or other) stall event. For example, when a PNE state machine returns to an idle state, all stall signals may be automatically reset, preventing further stall events from occurring.

In various embodiments, different types of stall events may be implemented. For example, stall events that are designed to slow down different resources of a processor may be implemented in a sequential fashion. In this manner, a first stall event may be implemented. Then during execution of the first stall event, the second stall event may be initiated and so forth. For example, in one embodiment a PNE may attempt to stop events, e.g., at a beginning of a processor pipeline. When unsuccessful, this may mean that deeper portions of the pipeline were closed, meaning that a lock situation is present in a lower or downward stage of a pipeline. Accordingly, stall events may be initiated beginning at the front end of the pipeline and moving inwardly therefrom, in some embodiments. As one example, a reorder buffer (ROB) first may be stalled. By stalling allocation of entries into a ROB, currently pending μops may be performed, allowing the core to reach an instruction boundary and therefore enable successful initiation of a PNE.

A next level may stall events of a reservation station. As one example, the reservation station may be prevented from dispatching already allocated μops for execution. One implementation may be a coarse-grained stall which prevents any dispatch of new μops, while a more fine-grained approach may prevent μops directed towards memory activities, e.g., load and store operations.

A third level may stall the allocation of entries into a memory order buffer (MOB). In some implementations, this type of stall event may be implemented only when the previous stall events have failed to resolve a lock situation. As an example, a MOB may be stalled by requiring in-order stores. That is, a next senior store cannot be dispatched until a previous senior store is completed. Furthermore, the stall event may cause load operations to be held until retirement.

Thus in various embodiments, a processor may be controlled to drain itself in order to resume operation and reach an instruction boundary such that a PNE may be successfully accomplished. In some embodiments, stall events may allow forward progress of μops in both a reservation station and a memory order buffer along with memory execution units, e.g., load and store units.

Note that at the completion of stall events across the platform (regardless of whether the stall events successfully remove a lock situation), control passes back to diamond 110. In other words, the method returns to its periodic benign operations, regardless of whether lock situations were present, resolved or unresolved. In this manner, benign operations may be implemented that do not affect system performance but can provide for breaking of lock situations without detecting their presence.

While described in FIG. 1 and FIG. 2 with respect to cores of a processor, injection of benign operations into a system can occur at different granularities. For example, instead of implementing benign operations on a per-core basis, such operations can be performed on more coarsely or finely-based levels. For example, benign operations may be implemented on only portions of a core, allowing finer-grained control. Such portions of a core may correspond to specific resources such as a pipeline, buffers, queues and the like. In other embodiments, benign operations may be effected on a coarser level, such as a per-processor basis or at the level of other system components, such as other bus agents, controllers, hubs or the like. Furthermore, in some embodiments different combinations of granularities may further be enabled.

Embodiments of the present invention may be used to aid in clearing different types of lock situations. For example, embodiments may be used to break a resonance-type lock situation, in which multiple blocks perform tasks at a resonant frequency, and where at least two tasks seek to use the same resource. By implementing benign operations in accordance with an embodiment of the present invention, the resonant frequency of one or both system blocks may be altered to avoid or remove the lock situation.

Other resonant situations may cause a lock such as due to contention based on, for example, snoop traffic. Such snoop traffic can kill events within a core. For example, where an event takes multiple cycles to prepare for issuance, and snoop traffic is incoming at. a rate around the number of cycles required for the event preparing, the incoming snoop traffic can prevent forward progress on the desired event. Using an embodiment of the present invention, one or more benign operations may be implemented to either prevent or reduce such snoop traffic, or to decouple the snoop traffic from the desired event.

Still further, by implementing benign operations across multiple system blocks, both an attacker block and an attacked block may be cleared of operations, allowing a lock situation to be removed. In this manner, the global implementation of benign operations can affect both attacked and attacking blocks. In this way, different timing patterns may arise in the blocks to avoid a lock situation going forward, enabling both blocks to pursue forward progress.

While the primary examples of benign operations described herein are cleaning-type events and stall events, other events to remove a lock without the need for detection can also be implemented. As one example, another type of event that may be injected into a system may be reordering of operations in one or more cores of a system. For example, an out-of-order processor may be controlled to execute in-order for a predetermined period of time in an effort to remove a lock situation. By performing in-order operations, no speculation is allowed and therefore false dependencies are not created, which could potentially raise a lock situation.

Figure 3:
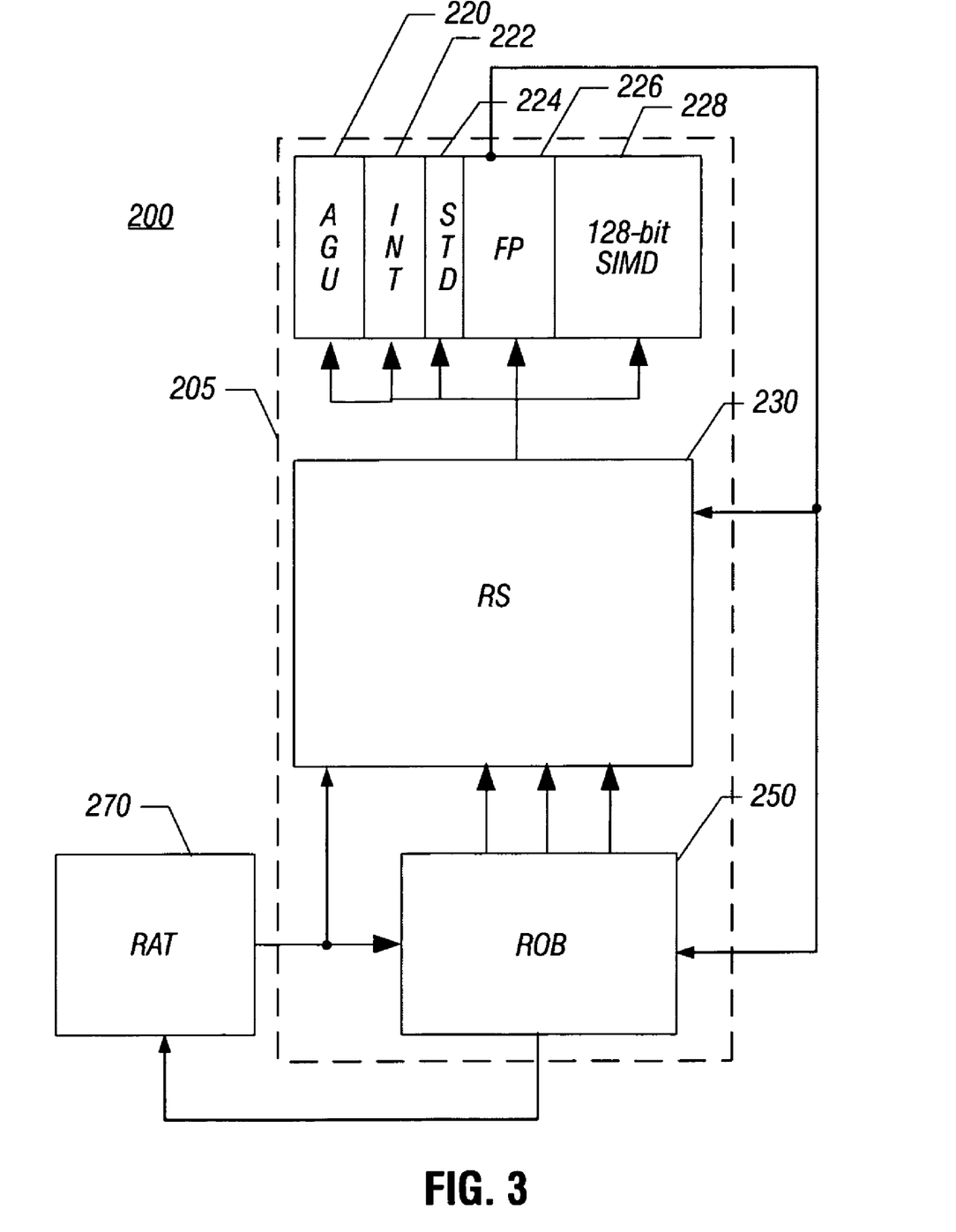
FIG. 3 is a block diagram of a processor in accordance with another embodiment of the present invention.

A processor may take many different forms depending on a desired architecture. Referring now to FIG. 3, shown is a block diagram of a processor in accordance with another embodiment of the present invention. As shown in FIG. 3, processor 200 includes a data path 205. Data path 205 may be controlled by front end control stages that may include a register alias table (RAT) 270, which may receive decoded instructions from a front end of the processor (not shown in FIG. 3). RAT 270 may be used to receive μops from the front end and rename the μops for the resources of the data path. In data path 205, the renamed μops may then be provided to a reorder buffer (ROB) 250. ROB 250 may act as a register file to store μops and corresponding source operands until the μop is ready for passing to a reservation station (RS) 230. Similarly, ROB 250 may also store corresponding results of μops that have already executed. These results may be held in ROB 250 until the μops are retired (at which point the ROB entry is freed). Since results are stored here, dependent μops may read ROB 250 for their source data if the source data are ready. If a μop's source data is not available in ROB 250, then the μop may wait in RS 230 until the source data becomes ready.

Thus RS 230 may be used to store μops until their corresponding source operands are present and/or until the μop is ready for execution in one of a plurality of execution units of data path 205. Reservation station 230 may include a plurality of dispatch ports to couple instructions and data to selected ones of execution units of data path 205. In some embodiments, multiple dispatch ports may be used in each cycle.

As shown in FIG. 3, the execution units in data path 205 include an address generation unit (AGU) 220, an integer (INT) execution unit 222, a store data (STD) unit 224, a floating point (FP) execution unit 226, and a single instruction multiple data (SIMD) execution unit 228. While shown in the embodiment of FIG. 3 as being a 128-bit execution unit, it is to be understood that SIMD unit 228 may be different widths in other embodiments. Of course, additional or different execution units may be present in different embodiments. After execution of a μop in one of the execution units, result data may be passed back to RS 230 and ROB 250 for storage, e.g., until retirement. While not shown in FIG. 3, it is to be understood that additional buffers such as a memory order buffer (MOB) and other resources may be present within processor 200.

It is further to be understood that the representation shown in FIG. 3 is intended for ease of discussion and in various embodiments many more stages or differently named stages may exist in a given processor. For example, a write back stage may be coupled to the execution units to receive result data for later delivery to the memory hierarchy. Alternately, one or more other buffers such as store buffers, load buffers and the like may be coupled to RS 230. As one example, one or more retirement buffers may be coupled to RS 230 for storage of μops and associated result data until retirement of the associated instruction.

Figure 4:
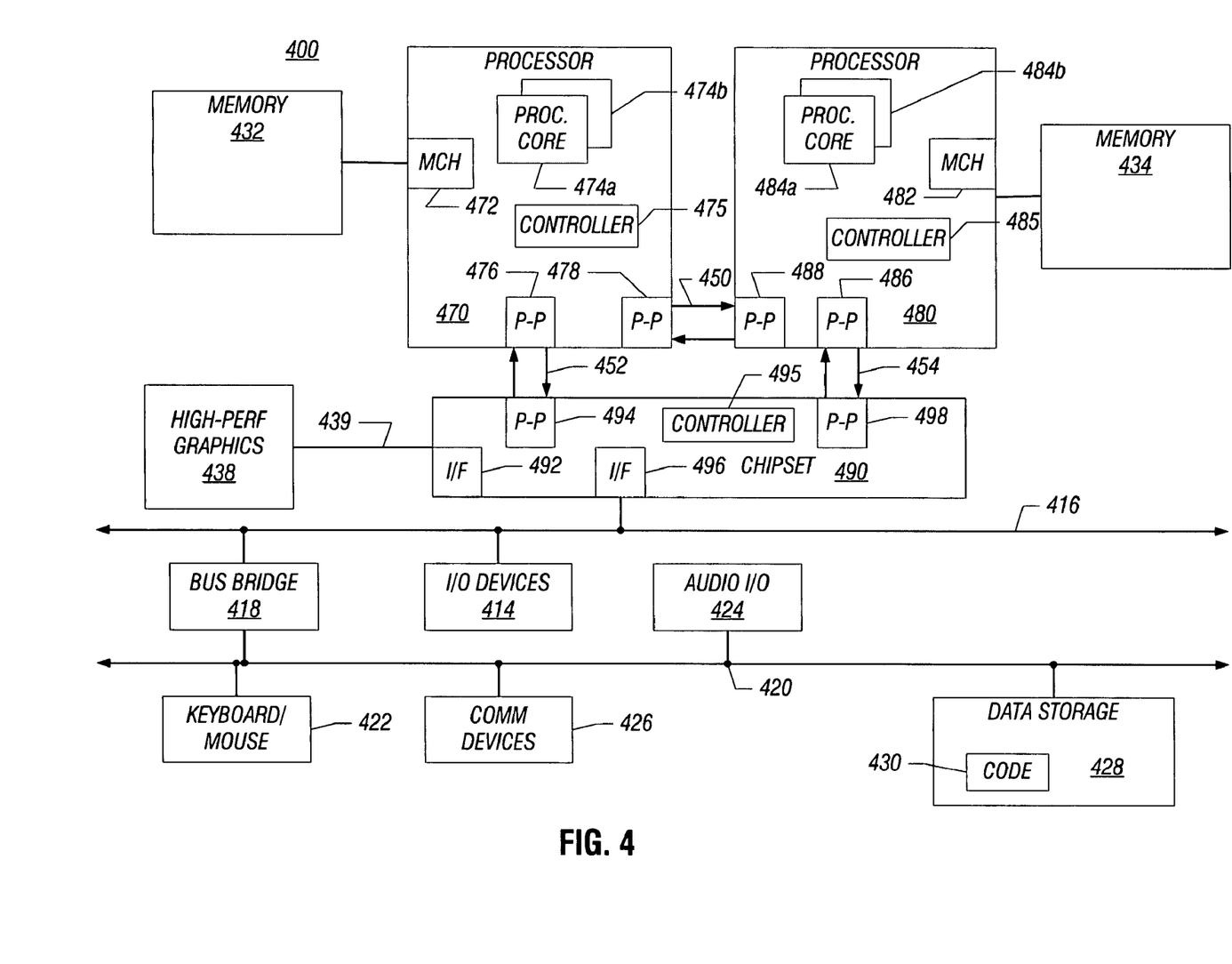
FIG. 4 is a block diagram of a system in accordance with one embodiment of the present invention.

Embodiments may be implemented in many different system types. Referring now to FIG. 4, shown is a block diagram of a system in accordance with an embodiment of the present invention. As shown in FIG. 4, multiprocessor system 400 is a point-to-point interconnect system, and includes a first processor 470 and a second processor 480 coupled via a point-to-point interconnect 450. As shown in FIG. 4, each of processors 470 and 480 may be multicore processors, including first and second processor cores (i.e., processor cores 474a and 474b and processor cores 484a and 484b). First processor 470 and second processor 480 each include a controller (respectively 475 and 485) that may be used to implement benign operations in accordance with an embodiment of the present invention. In some embodiments, additional per-core logic to implement one or more benign operations may be present within cores 474a and 474b and 484a and 484b. First processor 470 further includes a memory controller hub (MCH) 472 and point-to-point (P-P) interfaces 476 and 478. Similarly, second processor 480 includes a MCH 482 and P-P interfaces 486 and 488. As shown in FIG. 4, MCH's 472 and 482 couple the processors to respective memories, namely a memory 432 and a memory 434, which may be portions of main memory locally attached to the respective processors.

First processor 470 and second processor 480 may be coupled to a chipset 490 via P-P interfaces 452 and 454, respectively. As shown in FIG. 4, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

As further shown in FIG. 4, chipset 490 includes a controller 495, which may be a microcontroller in accordance with an embodiment of the present invention. Controller 495 may be used to control benign operations in first processor 470 and second processor 480. That is, controller 495 may act as a central controller to initiate cleaning operations and stall operations in various resources of first processor 470 and second processor 480. In embodiments including such a controller in chipset 490, the controllers present in the processors, i.e., controller 475 and controller 485, may be configured to act as slave controllers to controller 495. That is, controllers 475 and 485 may be configurable to act as a master controller if in a single processor system and act as a slave controller if in a multiprocessor system having an independent or central controller. Accordingly, in the embodiment of FIG. 4, controller 475 and controller 485 may initiate per-processor benign operations under control of controller 495. Furthermore, controller 475 and controller 485 may send acknowledgment signals back to controller 495. While described with this particular implementation in the embodiment of FIG. 4, it is to be understood that the scope of the present invention is not so limited.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420. Of course, other implementations are possible. For example, other embodiments may be implemented in a system having a different architecture such as a multi-drop bus system or another such system.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    initiating a cleaning operation using first logic whenever a clock signal with a periodic interval is triggered to clear a first processor core of a system of pending operations, the cleaning operation to attempt to break a lock situation without detecting the lock situation;
    in response to the cleaning operation being serviced in the first processor core before triggering of a next clock signal of the periodic interval, breaking a lock situation; and
    preventing injection of new events into a second processor core of the system in response to the cleaning operation not being serviced in the first processor core before triggering of the next clock signal of the periodic interval.

2. The method of claim 1, further comprising sequentially preventing the injection of new events at different locations in a pipeline of the second processor core.

3. The method of claim 1, further comprising initiating the cleaning operation in a plurality of processor cores of the system when the clock signal is triggered.

4. The method of claim 3, further comprising acknowledging completion of the cleaning operation by any of the plurality of processor cores in which the cleaning operation is serviced.

5. The method of claim 4, further comprising sequentially preventing injection of new events into the plurality of processor cores if the completion of the cleaning operation is not acknowledged by all of the plurality of processor cores.

6. The method of claim 1, further comprising preventing the injection of new events into the second processor core for a time based on a maximum number of pending operations in the second processor core.

7. The method of claim 1, further comprising initiating the cleaning operation on a resource-level of the first processor core.

8. The method of claim 1, wherein initiating the cleaning operation reduces snoop traffic between the first processor core and the second processor core.

9. The method of claim 1, further comprising breaking a resonant-type lock scenario between the first processor core and the second processor core in which a first block of the first processor core seeks to use a first resource and a second block of the second processor core seeks to use the first resource at a resonant frequency with the first block, via at least one of the cleaning operation and preventing the injection of new events.

10. An apparatus comprising:
    a first processing engine;
    a second processing engine coupled to the first processing engine; and
    a controller coupled to the first processing engine and the second processing engine, wherein the controller initiates a stall event sequentially in the first processing engine and the second processing engine in response to at least one of the first processing engine and the second processing engine not acknowledging successful completion of a clearing event initiated in the first and the second processing engines by a control signal based on a clock signal that is triggered at a periodic interval, the successful completion occurring prior to a next clock signal triggered at the periodic interval, wherein the successful completion of the clearing event breaks a lock situation.

11. The apparatus of claim 10, wherein the controller is to initiate the stall event if the first processing engine does not acknowledge the successful completion prior to a duration of the periodic interval.

12. The apparatus of claim 10, wherein the clearing event is to clear pending operations from a memory order buffer (MOB) of the first processing engine.

13. The apparatus of claim 10, wherein the stall event comprises a plurality of stall events each to be sequentially directed to a different resource of the first processing engine.

14. The apparatus of claim 10, wherein the controller is to first initiate the stall event in the first processing engine when the second processing engine does not acknowledge the successful completion of the clearing event.

15. The apparatus of claim 10, wherein at least one of the clearing event and the stall event is to break the lock situation in the apparatus without detection of the lock situation.

16. A system comprising:
a first processor including a first core and a second core, the first processor further including first logic which causes initiation of a pipeline flush of the first core and the second core whenever a timer signal is triggered at a periodic interval, without detection of a lock situation in either of the first core or the second core, the first processor further including second logic which sequentially stalls the first core in response to the first logic not receiving an acknowledgement signal of a successful pipeline flush from the second core after receipt of a first one of the timer signal and before receipt of a following one of the timer signal and which stalls the second core after stalling the first core in response to the first logic still not receiving the acknowledgment signal of a successful pipeline flush from the second core, wherein the successful pipeline flush breaks the lock situation; and
a dynamic random access memory (DRAM) coupled to the first processor.

17. The system of claim 16, further comprising a controller including the first logic and the second logic.

18. The system of claim 16, further comprising a second processor coupled to the first processor, the second processor including a third core and a fourth core, the second processor further including third logic to cause initiation of a pipeline flush of the third core and the fourth core according to the timer signal, the second processor further including fourth logic to stall at least one of the third core and the fourth core if the pipeline flush is unsuccessful in either of the third core and the fourth core.

19. The system of claim 18, wherein at least one of the pipeline flush and the stall is to break a lock situation in the system without detection of the lock situation.

20. The system of claim 16, wherein the first logic comprises a per-core logic located in the first core and the second core.

21. An article comprising a machine-readable storage medium storing instructions that when executed by a machine enable the machine to perform a method comprising:
providing, by first logic, a control signal based on a clock signal triggered at a periodic interval to a plurality of processor cores which initiates a cleaning operation in the plurality of processor cores without regard to whether a lock situation is present, resolved, or unresolved in any of the plurality of processor cores;
receiving an acknowledgment from the plurality of processor cores in response to the cleaning operation being completed, wherein the completion of the cleaning operation clears a lock situation; and
sequentially initiating a stall operation in the plurality of processor cores in response to the acknowledgement not being received from all of the plurality of processor cores within a first time corresponding to one or more iterations of the periodic interval, wherein the stall operation clears a lock situation present in at least one of the plurality of processor cores without detection of the lock situation.

22. The article of claim 21, wherein the method further comprises initiating the cleaning operation at a front end of a pipeline of each of the plurality of processor cores.

23. The article of claim 22, wherein the method further comprises initiating the stall operation at a downstream stage of the pipeline of each of the plurality of processor cores.

24. The article of claim 21, wherein the method further comprises disabling the stall operation in the plurality of processor cores when the acknowledgment is received from all of the plurality of processor cores.

25. The article of claim 21, wherein the method further comprises providing the control signal to the plurality of processor cores without sequentially initiating the stall operation if the acknowledgment was received from all of the plurality of processor cores within the first time.

26. The apparatus of claim 10, wherein the periodic interval of the clock signal is controlled based on configuration information present in a control register of the apparatus.

27. The apparatus of claim 10, wherein the stall event comprises a plurality of sequential stall events, wherein a first stall event is to stall events of a reorder buffer of the first processing engine, a second stall event is to stall events of a reservation station of the first processing engine, and a third stall event is to stall events of a memory order buffer of the first processing engine.

28. The apparatus of claim 27, wherein the second stall event is to be initiated during execution of the first stall event, and the third stall event is to be initiated during execution of the second stall event.

* * * * *